Jan. 27, 1942. H. RUTISHAUSER 2,270,904
INTERNAL COMBUSTION ENGINE
Filed May 5, 1939
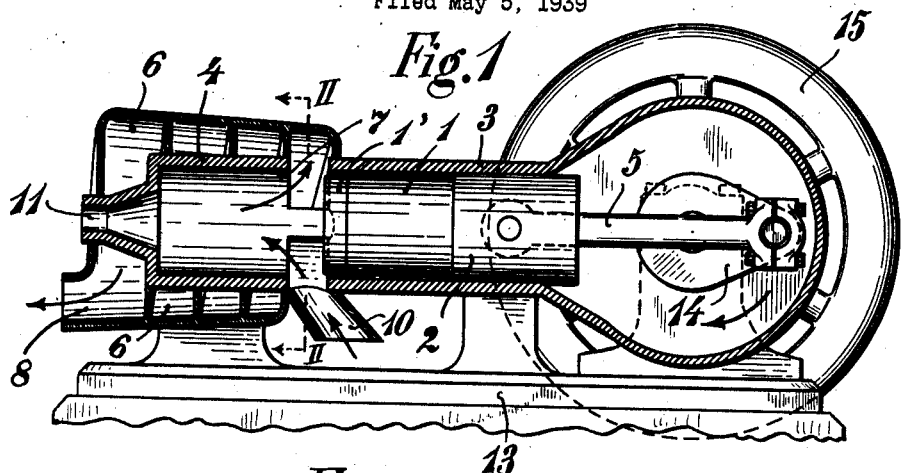
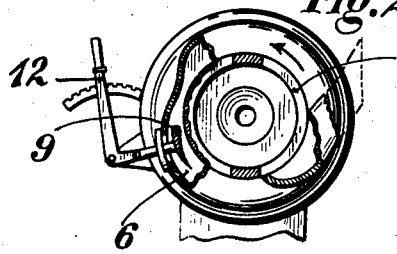
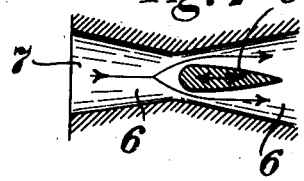
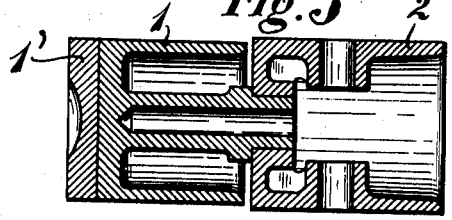
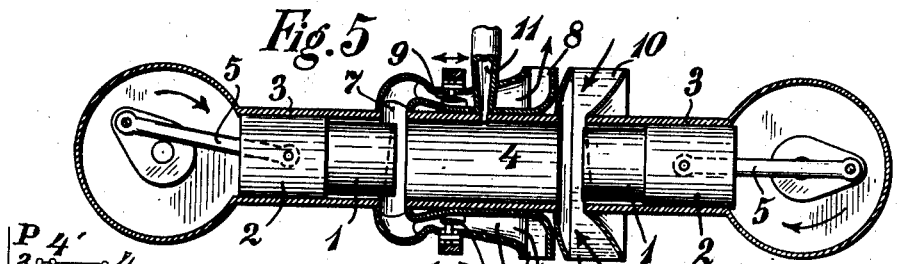
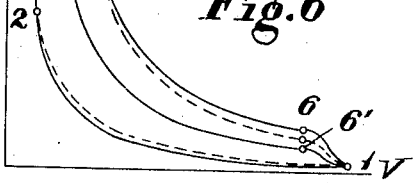
Inventor:
Hans Rutishauser
By Otto Munk
his Atty.

Patented Jan. 27, 1942

2,270,904

UNITED STATES PATENT OFFICE 2,270,904

INTERNAL COMBUSTION ENGINE

Hans Rutishauser, New York, N. Y.

Application May 5, 1939, Serial No. 271,893
In Switzerland March 23, 1939

24 Claims. (Cl. 123—51)

The present invention relates to a method of operating internal combustion engines and to an engine for carrying out this method. The invention has for its object an improvement of the thermal and hence also the effective efficiency relative to engines of hitherto known constructions. In the latter, the thermal efficiency is unfavourably affected, amongst other things, by the cooling of the walls bounding the thermal working space which is naturally present or artificially induced. This cooling has been necessary hitherto mainly in order to maintain the action of the lubricant in rendering possible the relative sliding of piston and cylinder on one another and, in the case of an unsymmetrical construction of the cylinder walls, in order to prevent inadmissible, non-uniform deformations. The usual cooling involves, according to the size and construction of the engine, a loss of about 15 to 30% of the heat energy of the fuel.

In the method of operating internal combustion engines according to the present invention, such a loss of heat energy is prevented in that, by avoiding a withdrawal of heat from the thermal working space of the engine, the beginning of the approximately adiabatic expansion is delayed. In this way there is obtained an increase in the energy area of the PV diagram. In addition, by heating the walls bounding the thermal working space, the beginning of the approximately adiabatic expansion can be further delayed.

The internal combustion engine for carrying out this method is, according to the invention, so constructed that injuries to the engine by the heat of combustion are prevented whilst avoiding a withdrawal of heat from the thermal working space of the engine. For this purpose the motor may advantageously be so constructed that the displacement part operates in the combustion space without rubbing friction. This may be achieved by making the displacement part, which in hitherto known constructions is also the sliding part, separate from the latter.

The invention is illustrated in the drawing in two constructional examples.

Fig. 1 shows a longitudinal section through the first constructional embodiment which is constructed as a single cylinder two-stroke engine, Fig. 2 is a partial section on the line II—II of Fig. 1, Fig. 3 shows to an enlarged scale the arrangement of the displacement part and the sliding part, Fig. 4 shows a detail to an enlarged scale and Fig. 5 shows in longitudinal section the second constructional embodiment constructed as an opposed piston two-stroke engine.

Fig. 6 is a graph illustrating the PV function according to the present invention.

In the constructional example according to Figs. 1-4, the frame of the engine is represented by 13. The displacement part 1 has a somewhat smaller diameter than the working cylinder 4 so that the part 1 works in the cylinder 4 without rubbing friction. Parts 1 and 2 are interconnected in known manner. Parts 1 and 2 may e. g. be screwed together, or part 2 may be shrunk on part 1 etc. To the part 2 which slides in the guide 3 is coupled the connecting rod 5 which is coupled with the flywheel 15 through the crank 14. In contradistinction to the usual construction, the displacement part is not also the sliding part but is separate therefrom. The two parts 1 and 2 have different diameters. The walls bounding the thermal working space, that is to say in particular those of the working cylinder 4 are made of heat resisting, non-oxidizable and infusible material. The walls of the thermal working space or the working cylinder 4 are heated by the exhaust gases. For this purpose there are arranged around the cylinder 4 helical heating passages 6 into which the exhaust gases enter at 7 and from which they pass out at 8. The orifice 7 is controlled by the displacement part 1, i. e. by the edge thereof. The heating passages 6 which are led helically around the surface of the cylinder are constructed as a Venturi tube. In the Venturi tube 6 is a control member 9 which is movable by means of a lever 12 in the direction indicated by the arrows in Fig. 4. By means of this member 9, the minimum cross-section of the tube 6 is adjustable for the purpose of suiting it to different working conditions. Fresh air enters at 10 into the working cylinder 4 and is compresed therein. Air inlet orifice 10 is likewise controlled by the displacement part 1, the same as exhaust orifice 7. When constructed as a Diesel engine, fuel is injected at 11. By constructing the heating passages 6 as a Venturi tube, a reduced pressure is obtained in known manner in the cylinder 4 at a certain moment and this draws in the fresh air.

As will be understood from what has been said above, injuries arising from the heat of combustion are prevented whilst avoiding a withdrawal of heat from the thermal working space of the engine.

To the front of the displacement part 1 is fixed a disc 1' of heat insulating material. This disc may also be dispensed with or the whole displacement part may be made of heat insulating material, such for example as kaolin.

A heat insulating layer may be arranged between the displacement part 1 and the sliding part 2. Similarly a heat insulating layer may also be provided between the working cylinder 4 and the guiding means 3.

Instead of making the displacement part of smaller diameter than the sliding part, it may be made of larger diameter.

In order to maintain as small as possible the leakage losses caused by the difference in diameter between the displacement part and the working cylinder, high speeds are desirable. In order nevertheless to obtain good scavenging, the opposed piston arrangement with longitudinal scavenging according to the Junkers principle as illustrated in Fig. 5, is particularly suitable. Here also the displacement parts 1 have a smaller diameter than the working cylinder 4 and than the guiding parts 2. The fresh air enters the working cylinder 4 at 10. The exhaust gases enter at 7 the heating passage 6 surrounding the working cylinder concentrically and leave this passage through the opening 8. A control member 9 is movable in the direction of the arrows in the heating passage which is here also constructed as a Laval nozzle.

Conversely there is obtained at low speeds, on account of the leakage losses, a correspondingly smaller compression pressure which simplifies starting of the engine.

The constructional embodiment of Fig. 5 has the advantage that the bridges in the ports are dispensed with and inlet and exhaust take place uninterruptedly at the periphery of the cylinder.

In the diagram of Fig. 6 the curve 1—2—3—4'—5'—6'—1, drawn in full lines depicts the theoretical course of a working cycle of a customary two-stroke Diesel motor. The curve 1—2—3—4—6—1 depicts the theoretical course of the motor according to the present invention. The curve shown in dotted lines represents approximately the actual course of the motor according to this invention. The dotted curve differs in the compression stage somewhat from the theoretical adiabatic curve, especially the corners at 3 and 4 are rounded off. Though remaining below the theoretical adiabatic curve during the expansion stage, the dotted curve follows an almost parallel course to the theoretical curve.

The operation of the construction shown in Fig. 1 of the drawing is substantially identical with that of Fig. 5, except that in the device according to Fig. 5 a double action takes place owing to the use of twin pistons.

The operation of both constructions will be clear from the following description in which special reference will be had to the device shown in Fig. 5.

The pistons 1 compress the air in the combustion chamber 4, whereby the air is heated to a point above the ignition temperature of the fuel. The fuel is injected through an injection valve provided in element 11. Injection takes place 15—5 crank angle degrees before the upper dead center. The fuel ignites explosively in the compressed air whereby the pressure in the combustion chamber 4 is increased. Meanwhile, the piston has passed the upper dead center and commences its working stroke. Up to 10° after the upper dead center hardly any work is performed, because the lever of the crank is still too short. It may be mentioned that in this interval, a great amount of heat is lost in ordinary motors, due to the transmission of heat to the cooling liquid or cooling air. According to the present invention, this loss of heat is prevented owing to the insulation of the combustion chamber by means of the hot exhaust gases. The purpose of these hot exhaust gases is to prevent heat escape through the cylinder wall. Due to this insulation the heat and hence the energy of the gases cannot escape in this interval of time and the gases therefore remain highly tensioned until they can transform their energy into work. Thus, the start of the adiabatic expansion is delayed. After this point has been passed, practically adiabatic expansion occurs. As soon as the piston, i. e. displacement part 1, withdraws from the exhaust orifice 7, the gas expands in the Venturi tube 6, where the entire exhaust energy is transformed into speed. After discharge of the exhaust gases, a low pressure is created in the section of the Venturi tube 6 adjacent the compression chamber 4. The effects of this low pressure extend into the combustion chamber 4. The low pressure is due to the fact that the exhaust gases are unable to pass back through the narrow passage of the Venturi tube, as blocked by control element 9, because the energy of the gases has already been spent. In order to pass back through this narrow passage, the gas would require the velocity of sound which it no longer possesses.

As previously stated, the expanded exhaust gas is utilized to prevent heat escape and to insulate the combustion chamber. The low pressure serves the purpose of drawing fresh air into the combustion chamber so as to completely fill the same, whereby the use of compressed air is avoided.

The invention may be used not only as above described for Diesel engines, but also for all other kinds of internal combustion engine, such as injection engines, gasolene engines, carburetor engines and so on.

I claim:

1. An internal combustion engine comprising a thermal working chamber in which combustion is to occur, a movable member positioned in said working chamber and adapted to be displaced by the expansion consequent upon said combustion, said movable member being arranged to be out of contact with the walls of said working chamber and means provided for conducting exhaust gases to heat outer surfaces of the walls bounding said working chamber.

2. An internal combustion engine comprising a thermal working chamber in which combustion is to occur, a movable member positioned in said working chamber and adapted to be displaced by the expansion consequent upon said combustion, said movable member being arranged to be out of contact with the walls of said working chamber and a passage formed as a Venturi tube and arranged on the outer surface of said working chamber, means for conveying exhaust gases from within said chamber to said passage, and control means for adjusting the minimum cross-section of said tube to suit different working conditions.

3. An internal combustion engine comprising a working cylinder, means for leading combustible material to said cylinder, a displacement member acting as a closure for said cylinder and adapted to be displaced by the expansion consequent upon combustion occurring in said cylinder, and guiding means located clear of said working cylinder for maintaining said displacement member out of contact with said cylinder, said displacement member and said guiding means being in heat-exchange relation with one another.

4. An internal combustion engine comprising a working cylinder, means for leading combustible material to said cylinder, a displacement member acting as a closure for said cylinder and adapted to be displaced by the expansion consequent upon combustion occurring in said cylinder, and guiding means located clear of said working cylinder for maintaining said displacement member out of contact with said cylinder being spaced apart to form an insulating air space therebetween for thermally insulating said working cylinder from said guiding means.

5. In an internal combustion engine, a combustion chamber, a piston adapted to move into and out of said chamber, supporting means for said piston, guiding means for guiding said piston and supporting means during movement of said piston, and heating means for said combustion chamber to prevent loss of heat produced during combustion, whereby the commencement of the substantially adiabatic expansion is delayed, said heating means comprising a spirally disposed conduit provided on the outside of said chamber and being in communication therewith to receive the exhaust gases therefrom.

6. In an internal combustion engine, a combustion chamber, a piston adapted to move into and out of said chamber, supporting means for said piston, guiding means for guiding said piston and supporting means during movement of said piston, and heating means for said combustion chamber to prevent loss of heat produced during combustion, whereby the commencement of the substantially adiabatic expansion is delayed, said heating means comprising gas conducting means on the outside of said chamber for receiving exhaust gases therefrom, a Venturi-tube forming part of said conducting means, and a control member for changing the cross-sectional area of said tube.

7. In an internal combustion engine, a combustion chamber, a piston adapted to move into and out of said chamber, supporting means for said piston, guiding means for guiding said piston and supporting means during movement of said piston, and heating means for said combustion chamber to prevent loss of heat produced during combustion, whereby the commencement of the substantially adiabatic expansion is delayed, said heating means comprising gas conducting means on the outside of said chamber for receiving exhaust gases therefrom, a Venturi-tube forming part of said conducting means, and a control member for changing the cross-sectional area of said tube, said control member being movably disposed in said tube.

8. In an internal combustion engine, a cylindrical combustion chamber, a piston adapted to move into and out of said chamber, cylindrical supporting means for said piston, the latter being of smaller cross-section than said cylindrical supporting means, a guiding cylinder for said piston and supporting means, said guiding cylinder being spaced from said combustion chamber and being disposed in axial alignment therewith, to permit said piston to slide from the guiding cylinder into said combustion chamber and back, an inlet and an outlet communicating with said combustion chamber and arranged in the space between said guiding cylinder and said combustion chamber, said inlet serving to admit fresh air to said combustion chamber, a conduit spirally surrounding said chamber and communicating with said outlet to receive exhaust gases from said combustion chamber, said piston acting as valve for said inlet and outlet, the hot exhaust gases in said conduit preventing heat escape from said chamber, whereby the beginning of substantially adiabatic expansion is delayed.

9. The construction claimed in claim 8, in which said conduit comprises a Venturi-tube and control means movably disposed in said conduit to change the cross-sectional area of said tube.

10. The construction claimed in claim 8, in which said conduit comprises a Venturi-tube, a tapered control member, support therefor and means for setting said support and the control member carried thereby in said tube to change the cross-sectional area thereof.

11. The device claimed in claim 8, comprising a second guiding cylinder, a second piston, and second supporting means, the latter supporting said second piston, said second piston and second supporting means being guided by said second guiding cylinder and adapted to move into and out of said combustion chamber, said conduit comprising a plurality of Venturi-tubes and control means associated with each Venturi-tube to change the cross-sectional area thereof.

12. In an internal combustion engine, the combination of a combustion chamber with a Venturi tube communicating therewith.

13. In an internal combustion engine, the combination with a combustion chamber comprising an exhaust port, of a Venturi tube communicating with said chamber through said port.

14. In an internal combustion engine, a combustion chamber provided with an exhaust port, a work piston adapted to move into and out of said chamber, a Venturi tube connected to said exhaust port, said work piston being adapted to open and close said port depending on its position relative thereto.

15. In an internal combustion engine, a combustion chamber provided with a fresh air inlet and an exhaust port, movable means adapted to move into and out of said chamber under the force of combustion, a Venturi tube connected to said exhaust port, said movable means being adapted to open and close said inlet and exhaust port depending on the position of the said movable means.

16. In an internal combustion engine, the combination with a combustion chamber, a conducting means connected to said chamber to receive exhaust gases therefrom, said conducting means surrounding the outside wall of said chamber and including a Venturi tube.

17. The device claimed in claim 15, in which said inlet and said exhaust port are disposed at the same end of said combustion chamber.

18. The device claimed in claim 15, comprising a stream-lined body movably disposed in said tube to vary the cross-sectional area thereof.

19. In an internal combustion engine, a combustion chamber, movable means adapted to be moved into and out of said chamber by the force of combustion, conducting means associated with and immovably disposed with respect to said chamber, said conducting means being adapted to receive heating means for heating said combustion chamber from without, whereby, due to the prevention of heat escape from said chamber the commencement of the adiabatic expansion is delayed.

20. In an internal combustion engine, a combustion chamber having an exhaust port, a casing surrounding said combustion chamber and communicating therewith through said exhaust port, said casing being stationary with respect to said combustion chamber and provided with an outlet, the latter being spaced from said port, the casing between said port and outlet forming a path for said exhaust gases along substantially the entire extent of said combustion chamber, said casing being closed between said port and said outlet to prevent the outer atmosphere from penetrating into the casing and cooling the exhaust gases, whereby said combustion chamber is heated by said gases and the commencement of adiabatic expansion is delayed.

21. Method of operating an internal combustion engine comprising a combustion chamber having a fresh air inlet and an exhaust port and a piston movable in said chamber, which method comprises the steps of compressing the air present in the combustion chamber, injecting fuel into the combustion chamber, igniting the fuel air mixture to cause the piston to perform an expansion stroke, applying heat to said combustion chamber from the outside during the expansion stroke, permitting said exhaust gases to escape through said exhaust port, opening said fresh air inlet, and creating a vacuum of predetermined degree at said exhaust port, whereby a sufficient amount of fresh air is sucked into said combustion chamber through the said inlet, thereafter compressing the air in the combustion chamber, and so on.

22. In an internal combustion engine, the combination of a combustion chamber having an opening, an exhaust conduit connected to said combustion chamber and communicating therewith through said opening, said conduit having an aperture leading to the outer atmosphere, a Venturi tube forming part of said conduit, said exhaust conduit forming a continuous, unbroken duct from the combustion chamber to said Venturi tube preventing escape of exhaust gases during their travel from said combustion chamber into said Venturi tube, a suction effect being created by the exhaust gases on passing through said Venturi tube, whereby the gaseous contents of the combustion chamber are sucked into said exhaust conduit.

23. The device claimed in claim 22, in which said combustion chamber is provided with an inlet for admitting fresh air thereto, whereby, due to said suction effect, fresh air is sucked through said inlet into said combustion chamber and supercharged therein, said suction effect also producing an efficient scavenging action in said combustion chamber.

24. The device claimed in claim 22, in which said combustion chamber is provided with an inlet for admitting fresh air thereto, whereby, due to said suction effect, fresh air is sucked through said inlet into said combustion chamber and supercharged therein, said suction effect also producing an efficient scavenging action in said combustion chamber, and a piston movable in said combustion chamber and adapted to close the opening in the combustion chamber leading to said exhaust conduit.

HANS RUTISHAUSER.